United States Patent [19]
Jenkins

[11] Patent Number: 4,876,524
[45] Date of Patent: Oct. 24, 1989

[54] SIX-AXIS JOYSTICK CONTROL

[76] Inventor: Richard L. Jenkins, 224 13th Ave. N.E., Calgary, Alberta, Canada, T2E 1B7

[21] Appl. No.: 208,794

[22] Filed: Jun. 20, 1988

Related U.S. Application Data

[63] Continuation of Ser. No. 885,691, Jul. 15, 1986, abandoned.

[30] Foreign Application Priority Data

Jul. 19, 1985 [CA] Canada .................................... 487089

[51] Int. Cl.$^4$ ............................................. G01L 1/22
[52] U.S. Cl. .................... 338/2; 73/862.04; 73/862.05; 338/5
[58] Field of Search ................ 338/2, 5, 6; 73/862.04, 73/862.05, 862.06

[56] References Cited

U.S. PATENT DOCUMENTS

| | | | |
|---|---|---|---|
| 2,449,883 | 9/1948 | DeForest | 338/2 X |
| 2,487,681 | 11/1949 | Weisselberg | 338/6 |
| 3,105,564 | 10/1963 | Ormond | 338/2 X |
| 3,448,424 | 6/1969 | Laimins | 338/6 X |
| 3,454,920 | 7/1969 | Mehr | 338/5 |
| 3,828,295 | 8/1974 | Bradley | 338/6 |
| 3,863,098 | 1/1975 | Mehr | 315/309 |
| 3,866,157 | 2/1975 | Birkholtz | 338/5 |
| 4,046,005 | 9/1977 | Goroski | 73/862.05 |
| 4,555,955 | 12/1985 | Morgan | 33/862.06 |
| 4,640,139 | 2/1987 | Fritz . | |

FOREIGN PATENT DOCUMENTS

| | | |
|---|---|---|
| 0176173 | 4/1986 | European Pat. Off. . |
| 3406059A1 | 2/1985 | Fed. Rep. of Germany . |
| 3405168A1 | 8/1985 | Fed. Rep. of Germany . |
| 8403396 | 3/1986 | Fed. Rep. of Germany . |
| 57-26726 | 2/1982 | Japan . |

OTHER PUBLICATIONS

Galileo, Galilei, "Discorsi e Dimonstrazioni Matematiche", Leyden, 1638.
S. Timoshenk and G. H. MacCullough, "Elements of Strength of Materials", p. 88, May 1940.
The Strain Gage Primer by C. C. Perry and H. R. Lissner McGraw Hill 1955, second edition 1962, pp. 32-33.
Micro Measurements Inc., Catalogue and Application Notes.
Measurement Systems Inc., Catalogue and Data Sheets 1975, 1986.
Polhemus Navigation Sciences Inc., Catalogue and Data Sheets, Jun. 1982.

Primary Examiner—C. L. Albritton
Attorney, Agent, or Firm—Saidman, Sterne, Kessler & Goldstein

[57] ABSTRACT

An isometric control device or the like of the type having an elastic beam and strain guages attached to the surface of the beam characterized by at least a first group of three strain guages (D, F, G) each having an operative axis thereof inclined with a single predetermined angle with respect to the main axis (z) of said beam (10), and the strain gauges disposed at a first predetermined level along said beam (10).

36 Claims, 4 Drawing Sheets

SIX-AXIS JOYSTICK CONTROL

This application is a continuation of application Ser. No. 885,691, filed 7/15/86, now abandoned.

BACKGROUND OF THE INVENTION

1. FIELD OF THE INVENTION

The present invention relates to an apparatus for generating electrical isometric control signals resolving applied forces in six degrees of freedom. In particular, it relates to a joystick control apparatus for three translational and three rotational degrees of freedom.

2. PRIOR ART OF THE INVENTION

Isometric control devices of the force operated or "stiff-stick" type have been known and in use for some time. These are useful in manually controlling motion in three dimensions in applications such as tracking systems, machine control and vehicular control. They are also useful for inputting information into computers in connection with three-dimensional computer graphics. The device is also known as a "joystick".

A joystick typically comprises a control rod or shaft fixed at one end, and on which are mounted strain gauges to measure the movement of the rod upon the application of forces. An electronic circuit processes the strain gauge signals and generates output signals representative of the force applied to the free end of the rod. In the past, such techniques and apparatuses were limited to four degrees of freedom. The strain gauges were typically arranged in pairs and were either parallel to the longitudinal axis of the control rod or at an angle. The known configurations did not permit three dimensional control in six degrees of freedom.

U.S. Pat. No. 3,454,920, issued July 8, 1969 Morton H. Mehr for an invention entitled "Isometric Control Device", describes a device for sensitive control purposes utilizing strain gauges and a shaft with a fixed end, the free end being operable by the thumb or finger as compared to its prior art where "stiff-stick" type controllers were. usually large and required handgrips. The patent describes use of a plurality of annularly arranged strain gauges on the shaft to give accurate control. A further aspect of the invention was the use of strain gauges comprising solid-state semi-conductors.

A three axis joystick control is described in U.S. Pat. No. 4,046,005, issued Sept. 6, 1977 to Robert D. Goroski. The patent discloses a fixed end control rod with strain gauges mounted on the rod in such a configuration as to provide signals for control in three degrees of freedom. The strain gauges are mounted in opposed pairs on the control shaft at angles to the shaft axis in order to provide control in three axis. The prior art devices resolved rotational forces or torque only about the shaft axis.

The resistances of certain types of strain gauges must be measured to measure applied forces. The change in resistance may be small, since if the control apparatus is to be robust and reliable it should be operated at low strains. If individual circuitry is used to sense and amplify each strain gauge signal, severe restraints must be placed on the stability of gain and zeroing to obtain a reasonably accurate output.

Semi-conductor strain gauges have been used to mitigate this problem; such gauges give a high output at the expense of increased fabrication costs and temperature sensitivity in comparison to a foil gauge. So extreme is the temperature sensitivity of semi-conductor gauges that small temperature differences between the ends of the control rod, as might be caused by the heat of the operator's hand, may cause substantial errors. Foil or wire gauges, less sensitive to strain, are much less sensitive to temperature, and give a better ratio of strain sensitivity to temperature sensitivity.

THEORETICAL CONSIDERATIONS

The control rod is a cantilever beam, rigidly fixed at one end, and free at the other. The rod is considered to be an isotropic, homogeneous beam of uniform circular cross-section and the stresses in the rod due to its own weight are neglected. Known beam theory may be applied to adapt the results for the violation of any of these assumptions.

A co-ordinate system is used consisting of three axes, x, y, and z, mutually at right angles, with the z axis aligned with the longitudinal axis of the control rod and the origin being at the free end of the rod. The results may be converted to any other complete three-dimensional coordinate system of interest by a simple mathematical transformation.

A thrust applied to the free end of the control rod along the z axis subjects the rod to a compressive or tensile stress which is equal at each point along its length. Similarly, if the control rod is twisted about the z axis at the free end, it will be subject to a torsional stress which does not vary along its length. Either or both of these quantities may be measured at any point along the length of the rod with equal validity.

If a torque $T_y$ is applied to the free end about the y axis, the rod will bend about an axis parallel to the y axis at a distance L from the origin, with a bending moment $M_y$ constant along its length. Hence $$M_y = T_y \tag{1}$$

If a force $F_x$ is applied to the free end along the x axis, the rod will again bend about the y axis, and the bending moment will vary linearly from zero at the origin to a maximum at the root:

$$M_y = L \cdot F_x \tag{2}$$

With a knowledge of the bending moment at two points along the rod, we may readily resolve the magnitudes of a torque and a force applied simultaneously, since the distributions of bending moments along the beam from the two causes are quite different. For simultaneous torque and force $$M_y = T_y + L \cdot F_x \tag{3}$$

If $M_{y1}$ and $M_{y2}$ correspond to moments at $L_1$ and $L_2$ respectively, then $$M_{y1} = T_y + L_1 \cdot F_x \tag{4}$$

$$M_{y2} = T_y + L_2 \cdot F_x \tag{5}$$

Subtracting (4)−(5) yields $$M_{y1} - M_{y2} = L_1 \cdot F_x - L_2 \cdot F_x \tag{6}$$

and $F_x = (M_{y1} - M_{y2})/(L_1 - L_2) \tag{7}$

Substituting in (4) for $F_x$, we obtain $$M_{y1} = T_y + L_1 \cdot (M_{y1} - M_{y2})/(L_1 - L_2) \tag{8}$$

and Ty=(My2·L1−My1·L2)/(L1−L2)     (9)

In each of these bending cases, the linear stresses in opposite faces will be of opposite sign, and in the neutral y-z plane dividing the rod there will be no stress.

In a symmetrical homogeneous rod, a torque about the x axis and a force along the y axis may be applied without any effect on the above equations, but may be resolved by applying similar equations to the moments about the x axis at two points along the rod.

From the above it can be seen that full six degrees of freedom resolution requires only measurements of z axis thrust and torque, plus bending moment about the x and y axes at two points along the rod.

As mentioned above, the prior art has not resolved torque except about the z axis, and has relied on placement of the strain transducers astride the neutral axes (where the neutral planes intersect the beam surface) to resolve x and y forces. A practical device should reject changes in strain gauge output due to disturbing influences, such as temperature variation, which affect all gauges equally. To achieve this, gauges have been used in pairs, arranged so that they are affected in opposite directions and by equal amounts by the variable to be measured, but are unaffected, or affected in the same direction and by equal amounts, by disturbing influences or undesired variables.

For example, Mehr (U.S. Pat. No. 3,454,920) used four gauges in differential pairs to sense bending near the fixed end of a beam in response to x and y forces; a differential electrical circuit rejected variation due to temperature and thrust, and gauge placement on neutral axes rejected the unwanted bending variable. Goroski (U.S. Pat. No. 4,046,005) used similar placement in pairs, inclining the gauges to resolve torsion about z as a differential quad.

Differential pairs become unwieldy when six variables are to be resolved. If all stresses and strains sum by linear vector addition within the beam, they may be resolved by linear equations from any set of independent measurements, provided the number of measurements is at least equal to the number of variables to be measured. Many materials exhibit this linear property, particularly if the stresses and strains are small; metals and alloys are mostly practically linear.

For the remaining description, it will be assumed, in addition to the assumptions in the first paragraph of this section, that the beam is perfectly elastic, in the sense that stress and strain are linearly related. Strain gauge signals will be assumed to have been converted to a numerical representation of true strain.

In practice, one more measurement is required than there are variables to be resolved, in order that temperature and similar disturbances may be rejected. A necessary and sufficient condition for the rejection of such unwanted influences, under the assumption that all gauges are equally affected, is that the sum of all gauge coefficients in each resolving equation be zero. Not all combinations of measurements are equally good; an optimal set will give roughly equal accuracy and amplitude for each output variable, given equal accuracy and sensitivity in the strain gauges, and the amplitudes will be as large as possible.

SUMMARY OF THE INVENTION

The ultimate object of the present invention is to provide a single isometric control device allowing full control in six degrees of freedom in three-dimensional space, being translational along, and rotational about, the three mutually perpendicular axes.

A feature of the present invention is that it utilizes a basic group of three strain gauges symmetrically disposed on the elastic beam or rod about its main axis, the z-axis in the x-y-z-co-ordinate system.

A further feature is that two or more groups of strain gauges, either the basic group of three gauges or a group according to Goroski in U.S. Pat. No. 4,046,005, are disposed at different levels along the beam.

The individual gauges within a basic group all make the same angle with respect to the main beam axis, which angle is less than $\cotan^{-1}$ of the Poisson ratio magnitude of the beam material. In practice, the angle will vary between zero degrees and forty-five degrees, although for most metals the critical angle is larger than forty-five degrees.

In a preferred embodiment, the top two groups (from the beam's free end) will have the same angle magnitude but be inclined in opposite directions. The bottom group will have an angle of ninety degrees, i.e. the operative axes of the strain gauges are transversal to the main beam axis. But in theory, the angle may be between $\cotan^{-1}$ the Poisson ratio magnitude and ninety degrees.

Yet another feature of the present invention is that no matter how many gauges are used a single electronic circuit processes the generated signals, which are sequentially sampled by the circuit prior to analog-to-digital conversion.

Accordingly, the present invention provides an isometric control device or the like of the type having an elastic beam and strain gauges attached to the surface of the beam CHARACTERIZED BY at least a first group of three strain gauges (D, F, G) each having an operative axis thereof inclined with a single predetermined angle with respect to the main axis (z) of said beam (10), and the strain gauges disposed at a first predetermined level along said beam (10).

BRIEF DESCRIPTION OF THE DRAWINGS

The present invention will be better understood in describing the preferred embodiments in conjunction with the attached drawings, in which.

DETAILED DESCRIPTION OF THE PREFERRED EMBODIMENTS

Before describing the preferred embodiments, reference is made to a general text entitled "The Strain Gauge Primer" by C. C. Perry and H. R. Lissner, published 1962 by McGraw-Hill.

Figure 1:
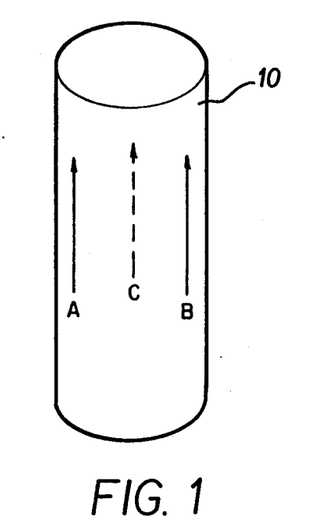
FIG. 1 is a perspective view of a gauge placement configuration for a group of three gauges.
Figure 2:
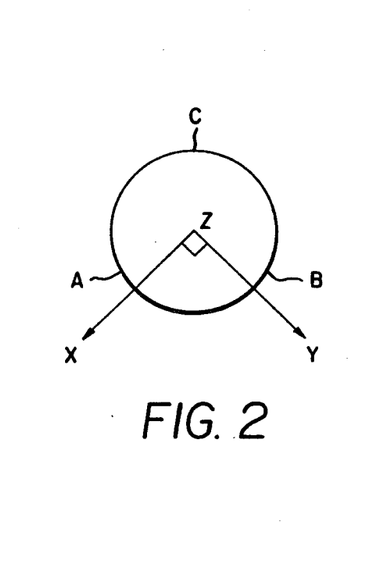
FIG. 2 is a plan view of the gauge placement configuration of FIG. 1.

Referring now to FIGS. 1 and 2 of the drawings, a basic strain gauge group according to the invention comprises three strain gauges A, B and C arranged symmetrically around the joystick shaft or rod 10. Since the shaft 10 is shown as being cylindrical, the symmetrical arrangement of the three gauges A, B and C means that they are disposed at 120° angles around the shaft 10. This is clearly shown in FIG. 2, which also shows an x-y co-ordinate system in place. As is well known, the coordinate system x-y may be transformed into any other by a simple mathematical operation. The symmetrical three gauge group A, B and C is suitable for measuring bending about the axes x and y. The gauges A, B and C, as shown, are parallel to the vertical or main shaft axis z. If as shown the axes x and y are symmetrically placed with respect to the gauges A, B and C, then the bending strains in the beam or shaft 10 about x and y are given by $$Sy = K1 \cdot (A \cos 15 - B \sin 15 - C \cos 45) \quad (10).$$

$$Sx = K1 \cdot (-A \sin 15 + B \cos 15 - C \cos 45) \quad (11)$$

Where A, B and C represent the signals from the strain gauges so labelled, Sx represents the bending strain about the x axis, Sy that about the y axis, and K1 is a constant. These equations reject unwanted influences affecting all gauges equally, since:

$$\cos 15 - \sin 15 - \cos 45 = 0 \quad (12)$$

Thus the measured values for bending in x and y are unaffected by thrust or tension in z, torsion about z, or temperature. This result does not depend on the particular choice of axis positions relative to gauge positions, the above being simply an example of the general case.

Using this configuration, the functions obtained by Mehr in U.S. Pat. No. 3,454,920 with four gauges are obtained with only three. Since only fixed multiplying coefficients and summing are needed to implement the resolving equations electronically, this may be done using standard analog computing techniques with four operational amplifiers.

Figure 3:
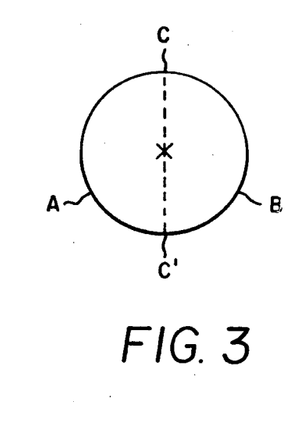
FIG. 3 is a plan view of an alternative gauge placement configuration for a group of three gauges.

Similar results for x and y bending are obtained with the configuration shown in plan in FIG. 3, with the gauge C moved to a position diametrically opposite C'; in this case, however, the sign of the third term in each of the above equations is positive, and disturbing influences are not rejected.

Figure 4:
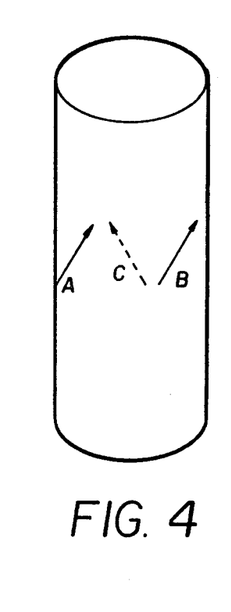
FIG. 4 is an elevation of another alternative gauge placement configuration for a group of three gauges, wherein the gauges are tilted with respect to the vertical axis.
Figure 5:
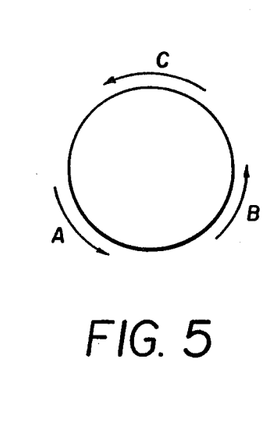
FIG. 5 is a plan view of the gauge placement configuration of FIG. 4.
Figure 6:
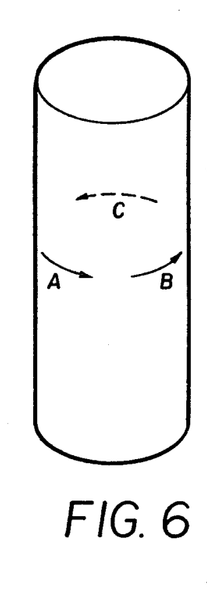
FIG. 6 is a perspective view of a gauge placement configuration for a group of three gauges, wherein the gauges are aligned at right angles to the vertical axis.

The above equations for x and y bending are unaffected if the gauges A, B and C or C' are all tilted at equal angles, and in the same direction, with respect to the z axis, as shown in FIGS. 4 and 5. As the tilt angle increases, the sensitivity to bending diminishes, reaching zero at an angle determined by the Poisson ratio of the rod 10 material, and then increases again but with its sign reversed. In the extreme case shown in FIG. 6, with the gauges aligned at right angles to the vertical z axis, the sensitivity is reduced by exactly Poisson's ratio, about $-0.3$ for many metals. When the gauges A, B and C are tilted, they are affected by shear strains along the principal axes x, y and z. Such strains may arise from two causes; torsion about z, or forces in x or y.

Torsion of the rod 10 about the z axis produces pure shear in the axial and tangential directions. This torsional shear is uniform around the rod 10, so that it will affect all gauges equally and will be eliminated in the resolution of bending strains. Measurement of this shear provides the basis for torque resolution.

Bending of the rod 10 due to applied forces along the x or y directions will produce shear forces, in addition to a bending moment. Since this shear is not uniform around the rod 10, it is not eliminated in resolution: it produces an apparent bending moment about the axis parallel to the applied force. Conventional beam theory provides the basis for calculating the magnitude of this shear, which depends on the exact proportioning of the beam, and may be negligible. For clarity of further explanation this shear effect will be ignored: if it is large enough to be important, it may readily be compensated, or reduced by re-proportioning the rod 10.

Figure 7:
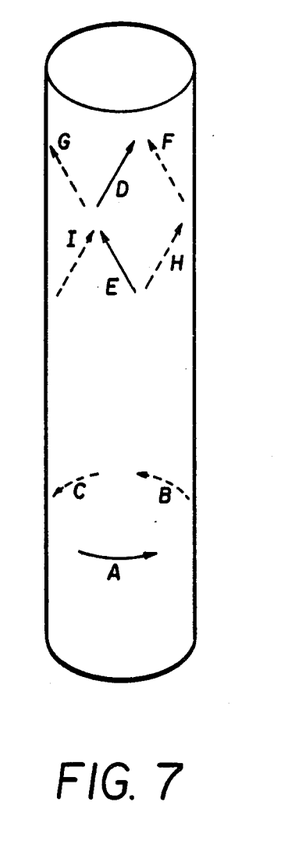
FIG. 7 is a perspective view of a gauge placement configuration for six-axis resolution.

An optimal arrangement for six axis resolution must sense x and y bending in two places separated along the length of the rod, as well as torque about z and thrust along z. Such an arrangement is shown in FIG. 7. The gauges A, B and C are arranged as in FIG. 6 to sense x and y bending at the base; gauges D, F and G sense similar variables at the top, using the arrangement of FIG. 4, and are set at an angle to the z axis. Gauge E, which is at a symmetrically opposite angle with the z axis, is used in conjunction with gauge D to measure the shear, which is proportional to the difference between gauge D and E signals. Similarly, two other gauges H and I are used in conjunction with the gauges F and G, so that the grouping (D, F, G) is repeated down the axis of the rod 10. Torque about the z axis is proportional to this shear.

Thrust along z is resolved as:

$$Fz = K2 \cdot ((D + F + G) - 1.5 (D - E) - (A + B + C)) \quad (13)$$

Where Fz is the force aligned with the z axis, A, B, C, D, E, F and G represent the strain signals from the gauges so labelled, and K2 is a constant.

In the above equation, the first and third terms both add to thrust sensitivity, since the third term is sensitive primarily to Poisson strain due to thrust, and Poisson's ratio is always negative. The middle term is used to compensate out the sensitivity of the first term to torque about z. Insensitivity to bending is a consequence of the balanced nature of the equations for resolving bending strain from each of the triplets A, B, C and D, F, G.

Because gauges D and E are at different points along the length of the rod some residual sensitivity to bending will remain, but since the pattern of bending strain is known the effect may be compensated; a similar comment applies to the bending sensitivity of the torque output. It may be possible to ignore such effects as small if the spacing of gauges D and G is much less than the spacing of gauges D and A.

To avoid the need for torque compensation, the arrangement of FIG. 2 in U.S. Pat. No. 4,046,005 to Goroski may be used for the gauges D and E. Both torque compensation and superimposition of gauges may be avoided if instead of gauge E alone, the three gauges E, H and I are used. In the alternative, the gauge E may be split into two gauges, one above and one below the gauge D at equal separations.

Electronic Circuit

It is common in strain gauge applications, such as those described above, that the resistances of many gauges must be measured to obtain the result required. The change of resistance of the gauges may be small, since if the device is to be robust and reliable it should be operated as low strains. If individual circuitry is used to sense and amplify each gauge signal, severe constraints must be placed on the stability of gain and zeroing to obtain a reasonably accurate output.

In the prior art semi-conductor strain gauges were used to mitigate these problems; such gauges give a high output at the expense of increased fabrication cost and temperature sensitivity in comparison to a foil gauge. So extreme is the temperature sensitivity of such gauges that small temperature differences between the ends of the beam, as might be caused in a joystick by the heat of the operator's hand, may cause substantial errors. Foil or wire gauges are less sensitive to strain, but much less sensitive to temperature, so they give a better ratio of strain sensitivity to temperature sensitivity.

An elegant solution is to share the same circuitry for all gauges, so that any drift in the circuitry affects all gauges equally and is cancelled during resolution.

Figure 8:
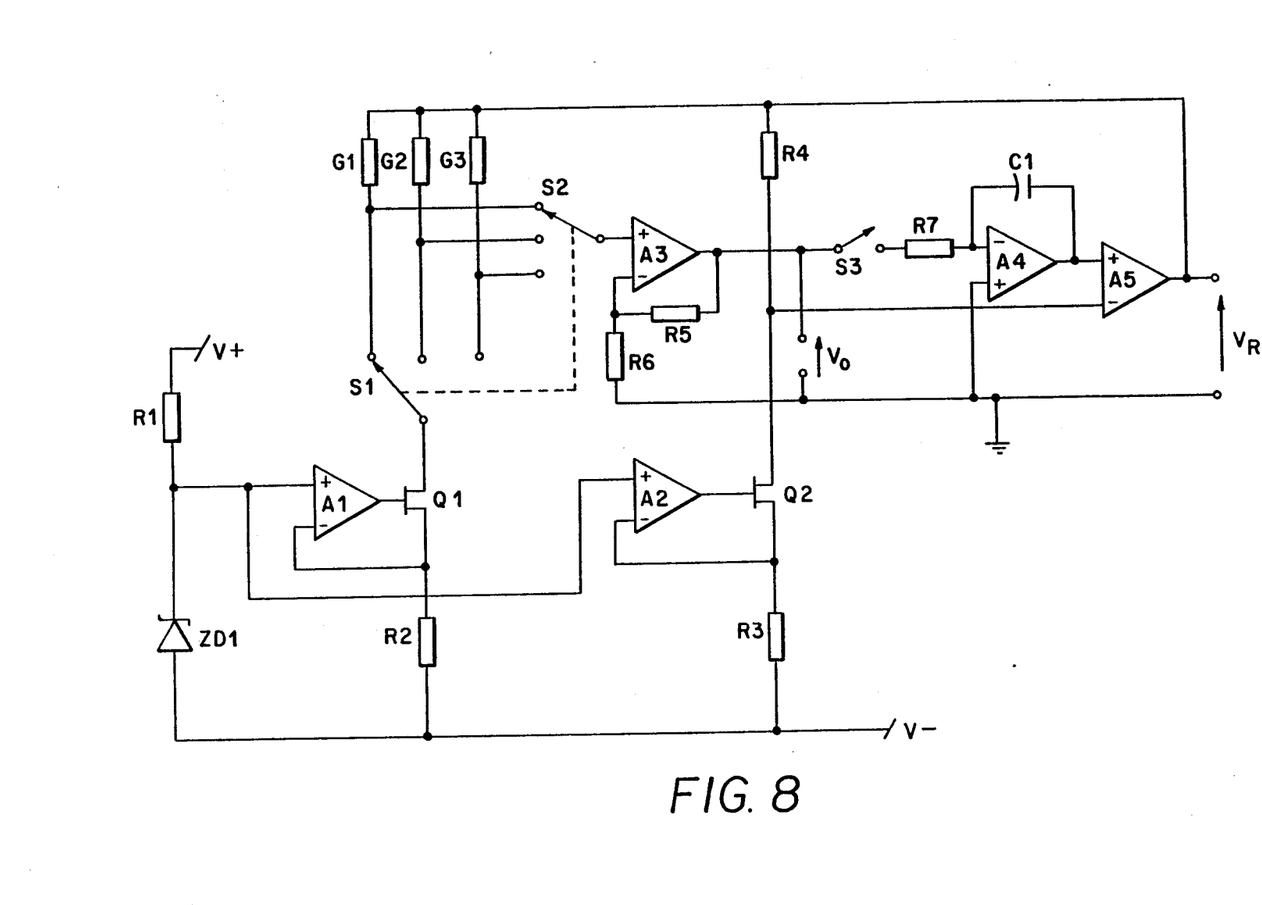
FIG. 8 is a schematic view of the electronic circuit for a single group of three gauges.

FIG. 8 shows a circuit which allows time division multiplexing of a preamplifier between multiple gauges.

FIG. 8 shows only three gauges G1, G2 and G3 in order not to clutter the schematic. One end of each gauge is connected to a common line, the output of operational amplifier A5. The other end of each connects to two switches, S1 and S2, which are in practice solid-state sampling switches.

Current is supplied to one gauge via S1, from a precision current source consisting of A1, Q1 and R2. Operational amplifier A1 acts to maintain the voltage across R2 equal to that across reference diode ZD1; if the amplifier input current is negligible, the current required in R2 must flow in the drain of Q1 regardless of drain voltage variation, and since the voltage across R2 is constant, so is Q1 drain current. A second similar current source composed of A2, Q2 and R3 provides current to R4, the opposite end of which is connected to the gauge common line. Hence, if the ratio of R2 to the gauge resistance is the same as the ratio of R3 to R4, the potential at Q2 drain will be the same as the potential at the lower end of the gauge connected to Q1 via S1, regardless of voltage drops in switch S1. Other methods of applying currents of a fixed ratio to two terminals at differing voltages would be equally useful in this section of the circuit.

Operational amplifier A5 operates to maintain Q2 drain potential at the same potential as the output of A4, by applying an appropriate voltage to the gauge common line.

Amplifier A3 amplifies the potential difference between the lower end of the currently selected gauge and ground, with gain set by the ratio of R5 to R6. It senses the potential of the gauge through S2, which is operated in synchronism with S1. Since S2 carries only the negligible input current required by A3, rather than the large current required to energize the gauge, voltage drops in S2 are negligible. The strain gauge output signal Vo is taken from the output of A3.

When S3 is closed, operational amplifier A4 operates to integrate the output of A3. If S3 is closed, and S1 and S2 are cycled repeatedly in synchronism through all their positions, the output of A4 will settle to the mean value of the amplified strain gauge outputs, plus an offset; feedback via A5, the gauge common line, S2 and A3 will act to reduce the mean value of Vo to zero. This may be regarded as the setting-up cycle of circuit operation: it removes the effects of circuit element tolerances, gauge tolerances, and disturbing influences on the gauges from the output Vo.

If S3 is now opened, no input current flows in the integrator, so that the output of A4 will remain constant. If S1 and S2 are again cycled in synchronism, the successive outputs of A3 will be proportional to the deviations of the gauge resistances from their mean value. Note that, since the gauges are fed from a current source, the potential difference across them is exactly proportional to resistance, without the non-linearity associated with conventional bridge circuits. During normal operation, measurements cycles (S3 open) may be interleaved with averaging cycles (S3 closed), to compensate any slow drifts in any part of the circuit. In practice it may be advisable to open S3 momentarily each time S1 and S2 are changed, so that any transients at A3 output are not included in the averaging process.

Assuming zero voltage offset on A3, the output voltage of A3 is related to the deviation of resistance from the mean by two multiplicative components only; the ratio of R5 to R6, and the voltage Vr. This circuit is thus particularly attractive when used in conjunction with an analog to digital converter of the ratiometric type, in which the digital output is proportional to the ratio of the applied input voltage to a reference voltage. If the voltage Vr is taken as the reference voltage for the analog to digital converter, the digital output will now be proportional to deviation of gauge resistance from the mean value, multiplied by the ratio of R5 to R6. Thus the only remaining source of instability in the circuit is the ratio of these two resistors, and resistors with a highly stable ratio are readily and cheaply available.

There remains the possible difficulty that the mean value of resistance is lost by this circuit. For the joystick application this is of no consequence, since a change in mean value by definition affects all gauges equally, and will be eliminated in the resolution of the forces.

The circuit may be used in a situation where the absolute resistance value is required by the simple expedient of adding to the set of gauges a stable reference resistor, whose value may be equal to the nominal gauge resistance. If the resistance deviations are converted to digital form, correction to absolute value is readily achieved by subtracting the measured reference value. Alternatively, if S3 is closed only when S1 and S2 are connected to the reference resistor, outputs from A3 will directly represent deviation from the reference value.

In a practical application, any number of gauges or other resistive devices may be connected, merely by extending the capabilities of switches S1 and S2. These switches are likely to be implemented as electronic rather than mechanical switches, for speed and reliability; the most important disadvantage of electronic switches, their relatively high resistance when "on", is rendered inconsequential by this circuit.

In a digital application, there may be advantage in replacing the combination of S3, A4 and associated components by a digital to analog converter. This converter may then be driven, for example, by a microprocessor which receives the digitised outputs of A3. This eliminates drift due to leakage in the hold capacitor circuit, and obviates the need for dedicated averaging cycles.

It may be preferred to run the gauge common line at a constant reference potential Vr. In this case, feedback may be maintained by using the output of A5 to modify the reference voltage applied to A1. For the highest feedback gain, the reference combination R1/ZD1 may simply be deleted, and A5 output connected to A1 positive input: for a lower gain, A1 may receive the sum of a reference and a proportion of A5 output. In either case, the inputs to A5 must be interchanged, to maintain negative feedback.

I claim:

1. A control device comprising:
   an elastic beam;
   strain gauges attached to the surface of said beam;
   a first group of not more than three of said strain gauges each having an operative axis thereof inclined with a single predetermined angle with respect to the main axis of said beam,
   said strain gauges being disposed at a first predetermined level along said beam.

2. A device comprising:
   an elastic beam;
   strain gauges attached to the surface of said beam;
   first and second groups of at least three said strain gauges disposed at first and second predetermined levels along said beam, respectively.

3. A device comprising:
   an elastic beam;
   strain gauges attached to the surface of said beam;
   first, second and third groups of strain gauges being disposed, at first, second and third predetermined levels along said beam, respectively, to measure bending forces in said beam at said first, second, and third levels.

4. The isometric control device as defined in claim 2, said first and second groups of strain gauges each comprising three strain gauges each having an operative axis thereof inclined, the first group with a first predetermined angle and the second group with a second predetermined angle, with respect to the main axis (z) of said beam.

5. The isometric control device as defined in claim 3, said first, second and third groups of strain gauges each comprising three strain gauges each having an operative axis thereof inclined, the first group with a first predetermined angle, the second group with a second predetermined angle and the third group with a third predetermined angle, with respect to the main axis (z) of said beam.

6. A control device comprising:
   an elastic beam;
   strain gauges attached to the surface of said beam;
   at least a first group of three of said strain gauges each having an operative axis thereof inclined with a single predetermined angle with respect to the main axis of said beam,
   said strain gauges being disposed at a first predetermined level along said beam,
   said single predetermined angle being less than $\cotan^{-1}$ of the Poisson ratio of the beam angle.

7. The isometric device as defined in claim 4, said first and second predetermined angles being opposite in direction and equal in magnitude, which is less than $\cotan^{-1}$ of the Poisson ratio of the elastic beam material.

8. The isometric device as defined in claim 5, said first and second predetermined angles being opposite in direction and equal in magnitude, which is less than $\cotan^{-1}$ of the Poisson ratio magnitude of the elastic beam material.

9. The isometric device as defined in claim 8, said third predetermined angle being ninety degrees.

10. The isometric device as defined in claim 1, said single predetermined angle having a magnitude selected between zero degrees and forty five degrees.

11. The isometric device as defined in claims 4 or 5, said first and second predetermined angles having a magnitude selected between zero degrees and forty five degrees, and being opposite in direction.

12. The isometric device as defined in claim 1, 2 or 3, further CHARACTERIZED BY having all strain gauge generated signals processed by a single electronic circuit by means of sequential sampling.

13. The isometric device as defined in claims 4, 5 or 6, further CHARACTERIZED BY having all strain gauge generated signals processed by a single electronic circuit by means of sequential sampling.

14. The isometric device as defined in claim 7, 8 or 9, further CHARACTERIZED BY having all strain gauge generated signals processed by a single electronic circuit by means of sequential sampling.

15. The isometric device as defined in claim 10, further CHARACTERIZED BY having all strain gauge generated signals processed by a single electronic circuit by means of sequential sampling.

16. A control device comprising:
    an elastic beam;
    strain gauges attached to the surface of said beam;
    at least a first group of three of said strain gauges each having an operative axis thereof inclined with a single predetermined angle with respect to the main axis of said beam,
    said strain gauges being disposed at a first predetermined level along said beam,
    said three strain gauges being symmetrically disposed on said beam about said main axis.

17. The isometric device as defined in claim 4, each three gauges in a group being symmetrically disposed on said beam about said main axis.

18. The isometric device as defined in claim 5, each three gauges in a group being symmetrically disposed on said beam about said main axis.

19. The isometric device as defined in claim 6, said three strain gauges being symmetrically disposed on said beam about said main axis.

20. The isometric device as defined in claim 7, each three gauges in a group being symmetrically disposed on said beam about said main axis.

21. The isometric device as defined in claim 8, each three gauges in a group being symmetrically disposed on said beam about said main axis.

22. The isometric device as defined in claim 9, each three gauges in a group being symmetrically disposed on said beam about said main axis.

23. The isometric device as defined in claim 10, said three strain gauges being symmetrically disposed on said beam about said main axis.

24. The isometric device as defined in claim 16, 19 or 23, said single predetermined angle having a magnitude selected between zero degrees and forty five degrees.

25. The isometric device as defined in claims 17, 18 or 20, said first and second predetermined angles having a magnitude selected between zero degrees and forty five degrees, and being opposite in direction.

26. The isometric device as defined in claims 21 or 22, said first and second predetermined angles having a magnitude selected between zero degrees and forty five degrees, and being opposite in direction.

27. The control device of claim 1, wherein said first group consists of exactly three of said strain gauges.

28. The control device of claim 2, wherein said first and second groups each consist of exactly three of said strain gauges.

29. The device of claim 1, wherein said beam is flexible in two axes.

30. The device of claim 2, wherein said beam is flexible in two axes.

31. The device of claim 3, wherein said beam is flexible in two axes.

32. The device of claim 2, wherein said beam is substantially equally flexible in two axes.

33. The device of claim 3, wherein said beam is substantially equally flexible in two axes.

34. The device of claim 2, further comprising a third group of strain gauges disposed at a third level on said beam.

35. The device of claim 1, wherein each said group of strain gauges is positioned to measure bending forces in said beam at said respective location thereof.

36. The device of claim 2, wherein each said group of strains gauges is positioned to measure bending forces in said beam at said respective location thereof.

* * * * *